United States Patent [19]

Gaidis et al.

[11] Patent Number: 5,656,075
[45] Date of Patent: Aug. 12, 1997

US005656075A

[54] CONTROL OF EXPANSION IN CONCRETE DUE TO ALKALI SILICA REACTION

[75] Inventors: James Michael Gaidis, Woodbine; Ellis Martin Gartner, Silver Spring, both of Md.

[73] Assignee: W. R. Grace & Co.-Conn., New York, N.Y.

[21] Appl. No.: 438,291

[22] Filed: May 10, 1995

[51] Int. Cl.$^6$ ............................................. C04B 14/04
[52] U.S. Cl. .................... 106/737; 106/600; 106/606; 106/638; 106/816; 106/819
[58] Field of Search .................................... 106/638, 737, 106/816, 819, 600, 606

[56] References Cited

U.S. PATENT DOCUMENTS

| | | | |
|---|---|---|---|
| 3,331,695 | 7/1967 | Angstadt | 106/713 |
| 3,832,195 | 8/1974 | Butler et al. | 106/631 |
| 3,841,886 | 10/1974 | Burr | 106/675 |
| 4,074,992 | 2/1978 | Voss | 65/30.14 |
| 4,074,993 | 2/1978 | Ackerman et al. | 65/30.14 |
| 4,486,545 | 12/1984 | Sugimoto et al. | 501/123 |
| 5,021,260 | 6/1991 | Kitagawa | 427/140 |
| 5,057,155 | 10/1991 | Nakayama et al. | 106/35 |

FOREIGN PATENT DOCUMENTS

| | | |
|---|---|---|
| 62-278151 | 3/1987 | Japan. |
| 2-212358 | 8/1990 | Japan. |
| 4-65315 | 3/1992 | Japan. |

OTHER PUBLICATIONS

Lithium Salt Admixtures—An Alternative Method to Prevent Expansive Alkali–Silica Reactivity by D.C. Stark—Portland Cement Association Jul., 1992.

New Approaches to Inhibiting Alkali–Aggregate Expansion by W.T. McCoy and A.G. Caldwell; ACI Journal Proceedings, vol. 47, May, 1991.

*Primary Examiner*—Anthony Green
*Attorney, Agent, or Firm*—Howard J. Troffkin

[57] ABSTRACT

A cement composition including spodumene which has been heated to at least 1000° C. which is capable of inhibiting expansion of the concrete due to the alkali-silica reaction. The present invention also provides a method of reducing expansion in cement compositions.

15 Claims, 1 Drawing Sheet

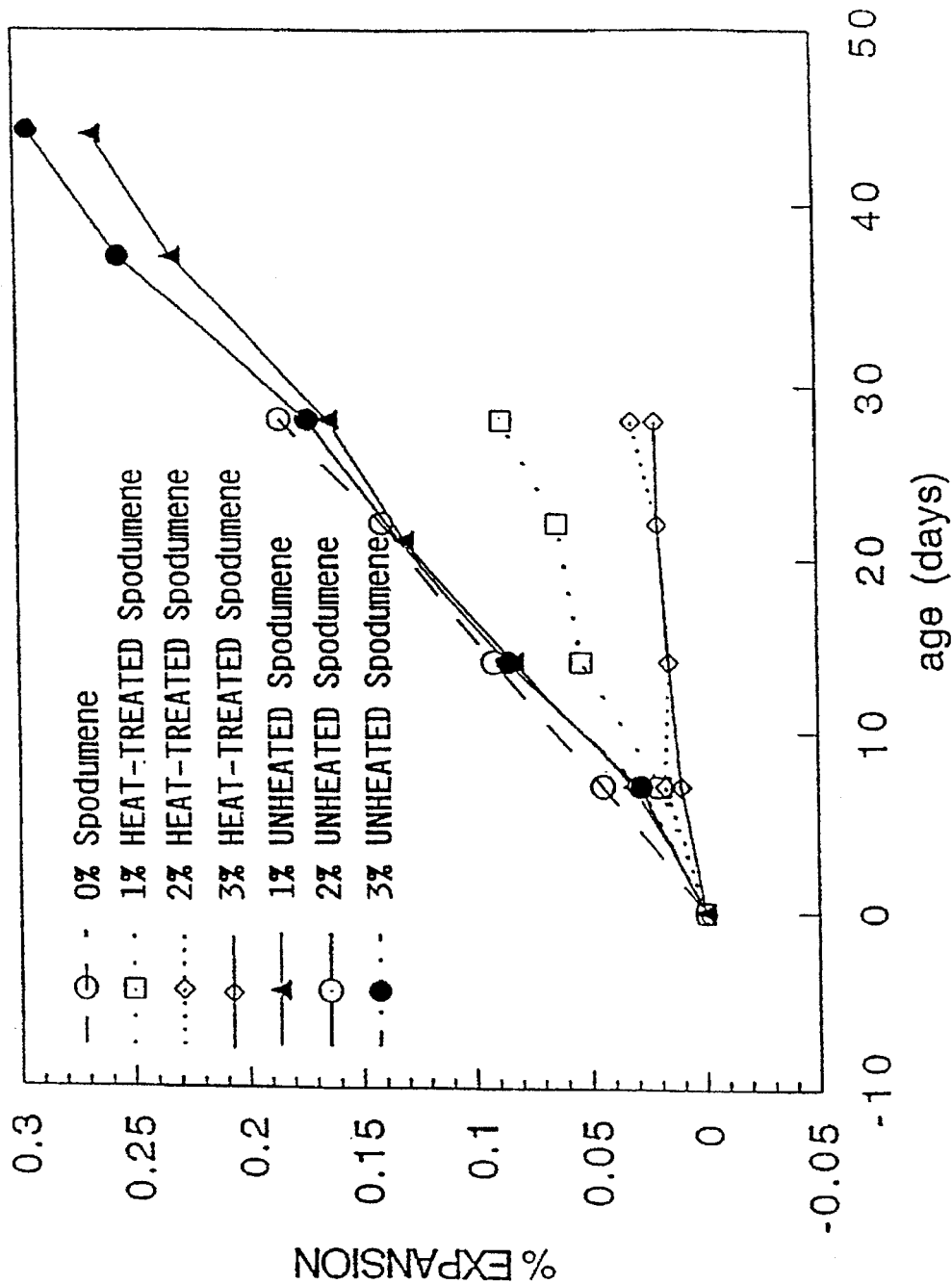

CONTROL OF EXPANSION IN CONCRETE DUE TO ALKALI SILICA REACTION

FIELD OF THE INVENTION

The present invention relates to admixtures for cement compositions that include spodumene to reduce expansion. In particular, the present invention relates to a cement admixture, and the resultant improved cement composition, capable of inhibiting cracking of concrete due to the alkali-silica reaction.

BACKGROUND OF THE INVENTION

Deterioration of concrete is known to occur due to chemical reactions between certain hydraulic cement constituents and those constituents present in the aggregate of a concrete mix. Certain materials are known to be reactive with the alkalies in cements. These materials include various forms of silica, such as opal, chalcedony, tridymite and cristobalite. For example, it is known that when hydrated silica which is inherent in aggregate comes into contact with sodium or potassium at high pH (the high pH being caused by hydroxyl ions present from alkaline compounds of cement), alkali silicate is formed. Alkali may also be derived from external sources such as deicing salts and sea water, as well as from internal sources such as admixtures, fly ash and alkali-bearing aggregates. Alkali silicates, which are the product of this "alkali-silica reaction", form a water swellable expansive gel deposit within and on the exterior surface of the aggregate particles contained in concrete. Under moist conditions, the swelling of this gel can eventually produce sufficient pressure to induce deleterious cracking and expansion of the concrete mass.

As a means to combat the "alkali-silica reaction", Japanese Kokai Patent Sho 62-278151 proposes adding $Li_2O$ to the cement during the course of preparing the concrete. Specifically, 0.01 to 5% by weight of $Li_2O$ is added to hydraulic cement that contains aggregates that can cause deleterious reactions. Disclosed sources of lithium include lithia mica, leafy feldspar, lithia pyroxene (i.e. the naturally occurring spodumene mineral, which is alpha-spodumene) containing 4 to 9.5% $Li_2O$, and petalite. The reference teaches that the lithium source is preferably added as a powder to form a uniform mixture with the cement.

U.S. Pat. No. 3,331,695 discloses mortar (cement, sand and water) and paste (cement and water) compositions which can achieve an accelerated hardening rate by adding 0.1 to 20% spodumene ($LiAlSi_2O_6$), based on the dry weight of the cement binder, to the cement of such cement compositions. The cement compositions of this '695 patent did not contain aggregate having the type of silica capable of entering into the deleterious alkali-silica reaction to exhibit cracking and expansion.

It is therefore an object of the present invention to provide a cement admixture capable of inhibiting alkali-silica reaction. It is a further object of the present invention to provide an improved concrete composition capable of inhibiting cracking and expansion as a result of alkali-silica reactions.

SUMMARY OF THE INVENTION

The present invention provides a cement admixture composed of a heat treated spodumene, as fully described hereinbelow, which is capable of inhibiting expansion of the cement due to the alkali-silica reaction and to the resultant improved cement composition. The present invention also provides a method of reducing expansion in cement.

BRIEF DESCRIPTION OF THE DRAWING

FIG. 1 is a graph comparing the expansion effects on cement compositions containing untreated versus heat-treated spodumene according to the present invention.

DETAILED DESCRIPTION OF THE INVENTION

The term "cement composition" as used herein and in the appended claims refers to compositions comprising a hydraulic cement binder and at least a sufficient amount of one aggregate having a silica content suitable to cause alkali-silica reaction. Such aggregate may be, for example, fly ash, silica fume, blast furnace slag, coarse aggregate having high silica content and the like. Generally, the cement compositions applicable to the present invention are concretes composed of a hydraulic cement (generally, a portland cement), fine aggregate (e.g. sand), coarse aggregate (e.g. gravel) and water, although mortars composed of a hydraulic cement, fine aggregate having high silica content in amounts to cause alkali-silica reaction and water are also applicable. Such compositions may additionally include other admixtures such as defoaming agents, air-entraining or detraining agents, set accelerators, set retarders, water reducing agents, superplasticizers, and other components known to those skilled in the art for altering properties of the composition. The cement compositions of the present invention are formed by mixing required amounts of certain materials, e.g., a hydraulic cement, water, and fine and/or coarse aggregate, as may be applicable for the particular cement composition being formed.

The minimum amount of silica necessary to cause the alkali-silica reaction expansion varies according to the type of silica and size of the silica contained in a cement composition. For example, very fine reactive aggregate (smaller than about 45 microns or −325 mesh U.S. Standard sieve) is not expansive but is pozzolanic, and thus adds to the cement bonding. On the other hand, opal, a very reactive hydrated silica, can cause expansion when present in about 2% or greater of the total weight of aggregate in cement compositions. Those skilled in the art can readily ascertain whether the type and quantity of silica is sufficient to cause expansion as a result of the alkali-silica reaction, by means of known test methods such as ASTM C-227 or C-441.

The present inventors have found that natural spodumene which has been heat treated, as described hereinbelow to cause it to go through phase transition from $\alpha$-spodumene to $\beta$-spodumene, provides a material capable of causing a significant reduction of expansion in cement due to the alkali-silica reaction.

The spodumene should be heated to at least 1000° C., preferably to about 1100° C. Heating above about 1400° C., and preferably above 1200° C., should be avoided to prevent melting of associated mineral impurities (gangue), which could lead to agglomeration rather than fracture due to phase change. The spodumene should be heated for a time sufficient to allow the entire spodumene mass being heat treated to reach the desired temperature. Thus, the spodumene based cement admixture of the present invention is conventional spodumene which has to be heated to at least 1000° C. but not greater than about 1400° C. and preferably from about 1100° C. to about 1200° C.

The present heat-treated spodumene product should be in the form of a free-flowing powder prior to incorporation into the cement composition. Preferably the heat-treated spodumene is ground to a particle size ranging from about 1 to about 10 µm, and is used in an mount of from about 1 to about 10% by weight based on the weight of the dry cement contained in the cement composition, preferably about 2 to 6% by weight of the dry cement. It has been found that the introduction of heat-treated spodumene to cement in these amounts substantially inhibits the expansion occurring as a result of the alkali-silica reaction. For example, limiting of expansion to not more than about 0.075 percent under ASTM C-227 procedure can be readily attained.

The following is an outline of the procedures used in the example that follows. All parts and percentages given hereinbelow and in the examples are by weight unless otherwise indicated. The examples are made for illustrative purposes only and are not meant to be a limitation on the invention as defined by the claims appended hereto.

Mortars were prepared in accordance with ASTM method C-109, sec. 10.1.1. The water/cement ratio was 0.485 and the sand/cement ratio was 2.75 with 10% of sand by weight replaced with −20+50 TECOSIL fused silica from CE Minerals. Sodium hydroxide was added and total alkali was expressed as weight percent of cement, including that present in the cement originally.

The mortars were mixed in accordance with ASTM method C-305 requirements. A Hobart mixer was used along with paddle and bowl that meets the required dimensions. The procedure for mixing was as follows:

Water added to dry mixing bowl

Cement added to bowl and mixer started at slow speed for 30 seconds

Sand then added over a 30 second period with mixer on slow speed

Mixer changed to medium speed for 30 second period

Turn mixer off for a 1.5 minute period

Finish mixing at medium speed for 1 minute

The spodumene was heated in a 2¾" diameter×1⅛" high platinum dish at 1050°–1100° C. in a muffle furnace for about 1 hour.

Molds were prepared in accordance with ASTM method C-490 sec. 4, except that no mineral oil was used to coat the inside of the mold. The molds were lined with thick polyethylene film.

The storage of the molds, after bars were cast, was in accordance with ASTM method C 227, section 8.1. Bars which were in the molds were stored at 73.4° F. in 100% humidity for 24 hours. The bars were then demolded and stored vertically in a metal storage box at 100° F. in 100% humidity in accordance with ASTM method C-227, section 8.2. The storage box was not cooled prior to opening. The water level was monitored every 7 days, but the box was not cleaned after every measurement.

Mortar bars were measured with a length comparator as described in ASTM method C 490, section 4.5. To simplify readings, the length comparator dial gauge was replaced with a digital dial gauge made by Chicago Instruments, Model #DPX1000. The length calibrator was calibrated with a reference bar in accordance with ASTM method C-490, section 4.5.3. An initial measurement was taken when the bars were demolded and this measurement was used as the reference measurement. Measurements were made every 7 days until the expansion became so great that there was no doubt of failure. When expansions were consistently small, measurements were made at less frequent intervals. Expansion was expressed as a percent change from the initial length measurement.

EXAMPLE

Mortar bars were made in accordance with the foregoing procedure, and various amounts of heat treated and untreated spodumene were independently added to the mixing bowls after the sand was added, but before any appreciable mixing of the sand had occurred. The bars were stored in accordance with ASTM method C227 as detailed above, and the expansion was observed. The results are shown in FIG. 1.

The addition of 1% heat-treated spodumene reduced the expansion by more than 50%, and 2% and 5% dosage of heat-treated spodumene controlled expansion almost completely. In comparison, the addition of 1%, 2% and 3% (based on cement) of untreated spodumene (−325 mesh) had little effect on expansion.

FIG. I graphically shows the results of the present example. Each point on the graph represents an average test result of four (4) bars. The graph clearly shows that the C-109 mortar bars were substantially unaffected when 1, 2 and 3 weight percent untreated spodumene was used and that utilization of the subject heat-treated spodumene caused substantial inhibition to expansion. The samples containing heat-treated spodumene (especially those having 2 and 3 weight percent dosages) exhibited substantially no expansion over a 12-month period of time.

What is claimed is:

1. A cement composition comprising a hydraulic cement binder, at least one alkali metal ion containing material wherein said alkali metal is selected from the group consisting of potassium, sodium and mixtures thereof, aggregate having silica which is reactive with the alkali metal ions present in said composition to form alkali metal silicates therein, and an effective amount of β-spodumene to inhibit expansion which is caused by said alkali metal silicates.

2. The cement composition of claim 1 wherein said β-spodumene is formed by heating spodumene to a temperature sufficient to have caused a phase transition from α-spodumene to β-spodumene.

3. The cement composition of claim 2, where said temperature to which said spodumene is heated to is at least about 1000° C.

4. The cement composition of claim 2, where said temperature to which said spodumene is heated to is from about 1100° C. to about 1200° C.

5. The cement composition of claim 2, wherein said spodumene is added in an amount of from about 1% to about 10% by weight based on the hydraulic cement in said composition.

6. The cement composition of claim 2, where said spodumene has a particle size ranging from about 1 to about 10μm.

7. The cement composition of claim 2 wherein said spodumene has been subjected to a temperature of at least about 1000° C., is present in from about 2% to about 6% by weight based on the weight of hydraulic cement in said composition, and has a particle size of from about 1 to about 10μm.

8. The cement composition of claim 2 wherein the composition is a concrete composed of hydraulic cement, fine aggregate, coarse aggregate and water and at least one of said aggregates contains sufficient amount of silica to react with alkali.

9. The cement composition of claim 2 wherein the composition is a mortar composed of hydraulic cement, fine aggregate and water and said fine aggregate contains sufficient amount of silica to react with alkali.

10. A method of reducing expansion of cement compositions composed of a cement binder, at least one alkali metal ion containing material wherein the alkali metal is selected from the group consisting of sodium, potassium and mixtures thereof, and aggregate having silica which is reactive with the alkali metal ions present in said composition to form alkali metal silicates therein comprising adding an effective amount of β-spodumene to the composition to inhibit expansion which is caused by said alkali metal silicates.

11. The method of claim 10 wherein said β-spodumene is formed by heating spodumene to a temperature sufficient to have caused a phase transition from α-spodumene β-spodumene.

12. The method of claim 11, wherein said spodumene is added in an amount of from about 1% to about 10% by weight based on the weight of hydraulic cement.

13. The method of claim 11, wherein said spodumene is heated to a temperature of at least about 1000° C.

14. The method of claim 11, wherein said spodumene has a particle size ranging from about 1 to about 10 μm.

15. The method of claim 11 wherein said spodumene has been heated to a temperature of at least about 1000° C., is added in from about 2% to about 6% by weight based on the weight of hydraulic cement in the cement composition, and has a particle size of from about 1 to about 10 μm.

* * * * *